United States Patent
Basin et al.

(10) Patent No.: US 9,434,032 B2
(45) Date of Patent: Sep. 6, 2016

(54) METHOD OF ASSEMBLING A STACKED PLANETARY GEAR SET

(75) Inventors: Leonid Basin, Farmington Hills, MI (US); Carlos E. Marin, Oxford, MI (US); Gary H. Paelicke, Saline, MI (US)

(73) Assignee: GM Global Technology Operations, LLC, Detroit, MI (US)

(*) Notice: Subject to any disclaimer, the term of this patent is extended or adjusted under 35 U.S.C. 154(b) by 633 days.

(21) Appl. No.: 13/419,933

(22) Filed: Mar. 14, 2012

(65) Prior Publication Data

US 2012/0272525 A1 Nov. 1, 2012

Related U.S. Application Data (60) Provisional application No. 61/479,160, filed on Apr. 26, 2011.

(51) Int. Cl.
*B23P 15/14* (2006.01)
*F16H 57/08* (2006.01)

(52) U.S. Cl.
CPC .............. *B23P 15/14* (2013.01); *F16H 57/082* (2013.01); *Y10T 29/49464* (2015.01); *Y10T 29/49465* (2015.01)

(58) Field of Classification Search
CPC ...... B23P 15/14; F16H 57/08; F16H 57/082; Y10T 29/49826; Y10T 29/49895; Y10T 29/4995; Y10T 29/49968
USPC .......................................... 475/903, 331, 337
See application file for complete search history.

(56) References Cited

U.S. PATENT DOCUMENTS

| | | | |
|---|---|---|---|
| 2,944,444 A | 7/1960 | Burns | |
| 3,008,355 A | 11/1961 | Grudin | |
| 3,081,648 A * | 3/1963 | Duer | F16H 1/28 475/342 |
| 3,527,121 A * | 9/1970 | Moore | F16H 57/082 475/282 |
| 3,540,311 A | 11/1970 | Chillson | |
| 4,224,838 A | 9/1980 | Roushdy et al. | |
| 4,229,996 A | 10/1980 | Hildebrand | |
| 4,793,214 A * | 12/1988 | Nurnberger | B62M 11/14 29/893.1 |
| 5,285,111 A | 2/1994 | Sherman | |
| 5,429,557 A | 7/1995 | Beim | |
| 5,484,348 A | 1/1996 | Brown et al. | |
| 5,503,605 A | 4/1996 | Beim | |
| 5,509,865 A * | 4/1996 | Hall, III | 475/340 |
| 5,558,173 A | 9/1996 | Sherman | |
| 5,718,300 A | 2/1998 | Frost | |
| 5,919,111 A | 7/1999 | Park | |
| 5,993,347 A | 11/1999 | Park | |
| 7,404,782 B2 | 7/2008 | Kudoh et al. | |
| 7,699,736 B2 | 4/2010 | Diosi et al. | |

(Continued)

FOREIGN PATENT DOCUMENTS

| | | |
|---|---|---|
| DE | 102008000428 A1 | 9/2009 |
| DE | 102008041201 A1 | 2/2010 |

(Continued)

*Primary Examiner* — Christopher Besler (57) ABSTRACT

A method for manufacturing a carrier assembly of a stacked planetary gear set is provided. The method includes forming the inner and outer spiders and attaching the spiders to a back plate or to each other to form the carrier assembly. One or both of the inner and outer carrier spiders are formed from powdered metal, by precision casting, and/or by stamping. The stacked planetary gear set may be axially aligned or axially offset.

16 Claims, 5 Drawing Sheets

(56) References Cited

U.S. PATENT DOCUMENTS

| | | |
|---|---|---|
| 7,803,082 B2 | 9/2010 | Diosi et al. |
| 7,824,302 B2 | 11/2010 | Diosi et al. |
| 2005/0192152 A1* | 9/2005 | Kimes .......................... 475/331 |
| 2006/0180366 A1 | 8/2006 | Brill et al. |
| 2008/0153653 A1 | 6/2008 | Diosi et al. |
| 2008/0269003 A1 | 10/2008 | Bauknecht et al. |
| 2008/0269004 A1 | 10/2008 | Diosi et al. |
| 2009/0305837 A1 | 12/2009 | Hiraiwa |
| 2010/0004085 A1 | 1/2010 | Haupt et al. |
| 2010/0041507 A1 | 2/2010 | Gumpoltsberger et al. |
| 2010/0041508 A1 | 2/2010 | Gumpoltsberger et al. |
| 2010/0041509 A1 | 2/2010 | Gumpoltsberger et al. |
| 2010/0044141 A1 | 2/2010 | Kimes et al. |
| 2010/0105515 A1* | 4/2010 | Goleski et al. ............... 475/341 |
| 2010/0190601 A1 | 7/2010 | Phillips |
| 2010/0210399 A1 | 8/2010 | Wittkopp et al. |
| 2010/0311537 A1 | 12/2010 | Ziemer |
| 2010/0323837 A1 | 12/2010 | Rosemeier et al. |
| 2011/0009228 A1 | 1/2011 | Bauknecht et al. |
| 2011/0009229 A1 | 1/2011 | Bauknecht et al. |
| 2011/0028265 A1* | 2/2011 | Johnson ................. B60K 17/16 475/331 |

FOREIGN PATENT DOCUMENTS

| | | |
|---|---|---|
| DE | 102009027775 A1 | 1/2011 |
| EP | 0849498 A2 | 6/1998 |
| WO | WO2010139553 A1 | 12/2010 |
| WO | WO2010139559 A1 | 12/2010 |

* cited by examiner

METHOD OF ASSEMBLING A STACKED PLANETARY GEAR SET

CROSS-REFERENCE TO RELATED APPLICATIONS

This application claims the benefit of U.S. Provisional Application No. 61/479,160, filed on Apr. 26, 2011, which is herein incorporated by reference in its entirety.

FIELD

The invention relates generally to a method for assembling a stacked planetary gear set, and more particularly a method for assembling a planet carrier assembly having inner and outer planet gears in a stacked planetary gear set.

BACKGROUND

The statements in this section merely provide background information related to the present disclosure and may or may not constitute prior art.

A typical planet carrier assembly used in planetary gear sets includes a spider carrier welded to a carrier flange or shell. A plurality of pinion pins and pinion washers are supported for rotation within the spider carrier. The pinion pins in turn support for rotation a plurality of planet gears. In stacked planetary gear sets, two spider carriers are typically welded to the carrier flange, each spider carrier supporting a set of planet gears. The spider carriers are typically formed by machining.

While previous methods for assembling a planet carrier are useful for their intended purpose, there is room in the art for improved methods of assembling planet carriers in stacked planetary gear sets that reduce construction and machining costs, decrease package size, and reduce the weight of a transmission.

SUMMARY

A method for manufacturing a carrier assembly of a stacked planetary gear set is provided. The method includes forming the inner and outer spiders and attaching the spiders to a back plate to form the carrier assembly. The spiders may be brazed, welded, staked, pin staked, or rolled to the back plate. In yet another embodiment, the inner spider and the back plate are formed from a single piece to form an inner carrier and the outer spider is attached to the inner carrier. In yet another embodiment, the outer spider and the back plate are formed from a single piece to form an outer carrier and the inner spider is attached to the outer carrier. The stacked planetary gear set may be axially aligned or axially offset.

In one form, a method of manufacturing a stacked planetary set is provided that includes forming an inner carrier spider and an outer carrier spider, at least one of which is formed from powdered metal, by precision casting, and/or by stamping. The method includes attaching the inner carrier spider to a portion of the outer carrier spider or a back plate.

In another form, a method of manufacturing a stacked planetary gear set is provided that includes forming inner and outer carrier spiders from powdered metal, by precision casting, or by stamping. The inner carrier spider is formed having a plurality of inner legs defining a plurality of circumferentially oriented inner windows. The outer carrier spider is formed having a plurality of outer legs defining a plurality of circumferentially oriented outer windows. The method includes attaching the plurality of inner legs and the plurality of outer legs to a back plate by brazing, welding, staking, pin staking, or rolling. The method also includes precision machining pinion holes through the inner and outer spider carriers and the back plate. Further, the method includes inserting two or more inner planet gears through the inner and outer windows, inserting corresponding inner pinion pins through the inner planet gears, and securing the inner pinion pins to one or both of the back plate in the inner carrier spider. Similarly, the method includes inserting two or more outer planet gears through the outer windows, inserting corresponding outer pinion pins through the outer planet gears, and securing the outer pinion pins to one or both of the outer spider carrier and the back plate.

In yet another form, a method of manufacturing a stacked planetary gear set is provided that also includes forming inner and outer carrier spiders from powdered metal, by precision casting, or by stamping. The inner carrier spider is formed having two or more inner legs defining circumferentially oriented inner windows and a back plate portion surrounding the inner legs. The outer carrier spider is formed having a two or more outer legs defining circumferentially oriented outer windows. The method includes attaching the plurality of outer legs to the back plate portion of the inner carrier spider by brazing, welding, staking, pin staking, or rolling. The method further includes precision machining pinion holes through the inner and outer spider carriers. In addition, the method includes inserting two or more inner planet gears through the inner windows, inserting corresponding inner pinion pins through the inner planet gears, and securing the inner pinion pins to the inner carrier spider. Similarly, the method includes inserting two or more outer planet gears through the outer windows, inserting corresponding outer pinion pins through the outer planet gears, and securing the outer pinion pins to one or both of the outer spider carrier and the back plate portion of the inner spider carrier.

In still another form, a method of manufacturing a stacked planetary gear set is provided that also includes forming inner and outer carrier spiders from powdered metal, by precision casting, or by stamping. The inner carrier spider is formed having two or more inner legs defining circumferentially oriented inner windows. The outer carrier spider is formed having two or more outer legs defining circumferentially oriented outer windows and a back plate portion extending radially inwardly from the outer legs. The method includes attaching the inner legs to the back plate portion of the outer carrier spider by brazing, welding, staking, pin staking, rolling, or splines. The method also includes precision machining pinion holes through the inner and outer spider carriers. The method further includes inserting inner planet gears through the inner windows, inserting corresponding inner pinion pins through the plurality of inner planet gears, and securing the plurality of inner pinion pins to one or both of the inner carrier spider and the back plate portion of the outer carrier spider. Similarly, the method includes inserting outer planet gears through the outer windows, inserting corresponding outer pinion pins through the outer planet gears, and securing the outer pinion pins to the outer spider carrier.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
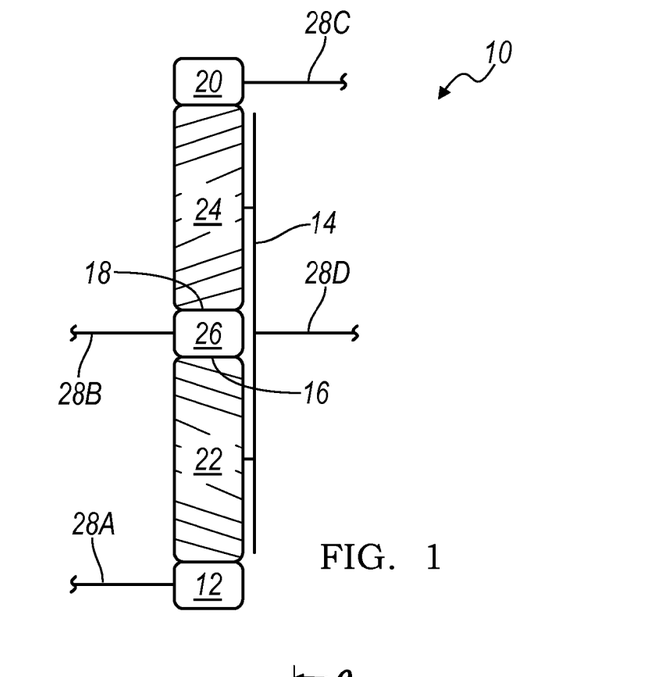
FIG. 1 is a stick diagram of an exemplary stacked planetary gear set manufactured according to the principles of the present invention.

With reference to FIG. 1, a stacked planetary gear set is generally indicated by reference number 10. The stacked planetary gear set 10 includes a first sun gear 12, a planet carrier member 14, a first ring gear 16, a second sun gear 18, and a second ring gear 20. The first sun gear 12 is drivingly engaged, or intermeshed with, each of a plurality of inner planet gears 22. The first ring gear 16 is also drivingly engaged, or intermeshed with, each of the plurality of inner planet gears 22. The second sun gear 18 is drivingly engaged or intermeshed with, each of a plurality of outer planet gears 24. The second ring gear 20 is also drivingly engaged, or intermeshed with, each of the plurality of outer planet gears 24.

The first ring gear 16 and the second sun gear 18 are formed on a common member 26. For example, the first ring gear 16 is formed along an inner periphery of the member 26 and the second sun gear 18 is formed along an outer periphery of the member 26. Alternatively, the first ring gear 16 and the second sun gear 18 may be separate members that are connected together to form a single, commonly rotating element.

Each of the components of the stacked planetary gear set 10 including the first sun gear 16, the first ring gear 16 and the second sun gear 18, the second ring gear 20, and the carrier member 14 may each be connected to various other components, indicated schematically by reference numbers 28A-D, respectively. These components 28A-D may include, for example shafts, countershafts, layshafts, sleeve shafts, clutches, brakes, turbine shafts, a transmission housing, or other planetary gear sets, to name but a few.

Figure 2:
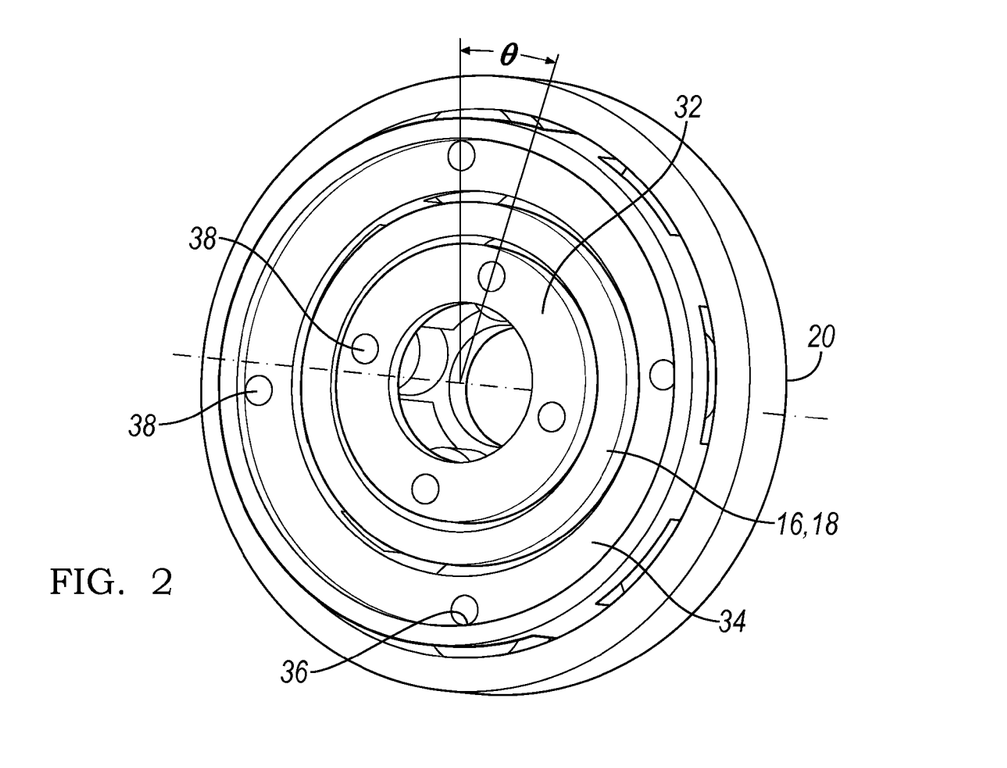
FIG. 2 is a isometric back view of the exemplary stacked planetary gear set shown in FIG. 1.
Figure 3:
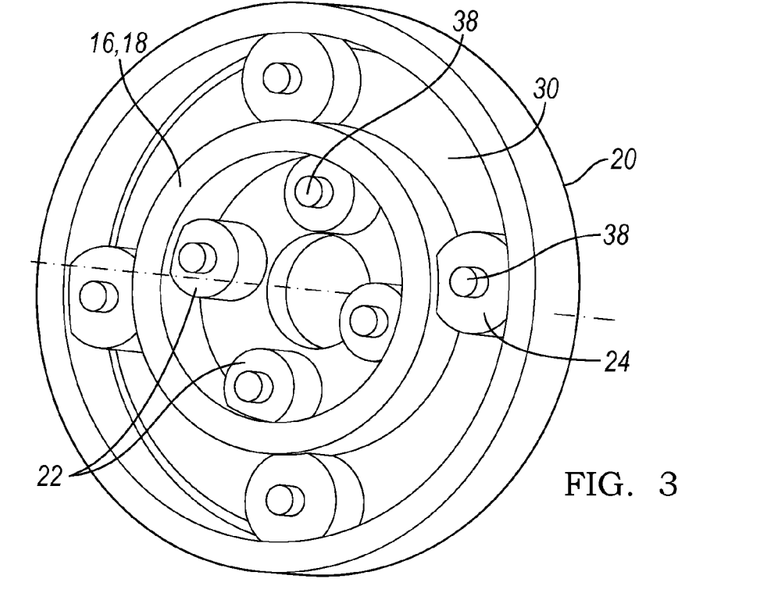
FIG. 3 is an isometric back view of the exemplary stacked planetary gear set shown in FIG. 2 with two spiders removed.

With reference to FIGS. 2 and 3, the assembled planet carrier 14 includes a flange or back plate 30 and a first or inner spider 32 attached to the back plate 30 and a second or outer spider 34 attached to the back plate 30 radially outwardly of the inner spider 32. The back plate 30 and the spiders 32 and 34 each include a plurality of axially aligned pinion holes 36 formed therethrough. Each set of axially aligned pinion holes 36 support for rotation a planet pinion 38. The planet pinion pins 38 each in turn support one of the plurality of inner and outer planet gears 22, 24 for rotation thereon. While in the example provided four inner planet gears 22 and four outer planet gears 24 are shown, it should be appreciated that any number of planet gears 22, 24 may be employed. In addition, the inner planet gears 22 are radially offset from the outer planet gears 24 at an angle "theta". Theta is preferably from about 15 degrees to about 75 degrees, and preferably about 45 degrees.

Figure 4:
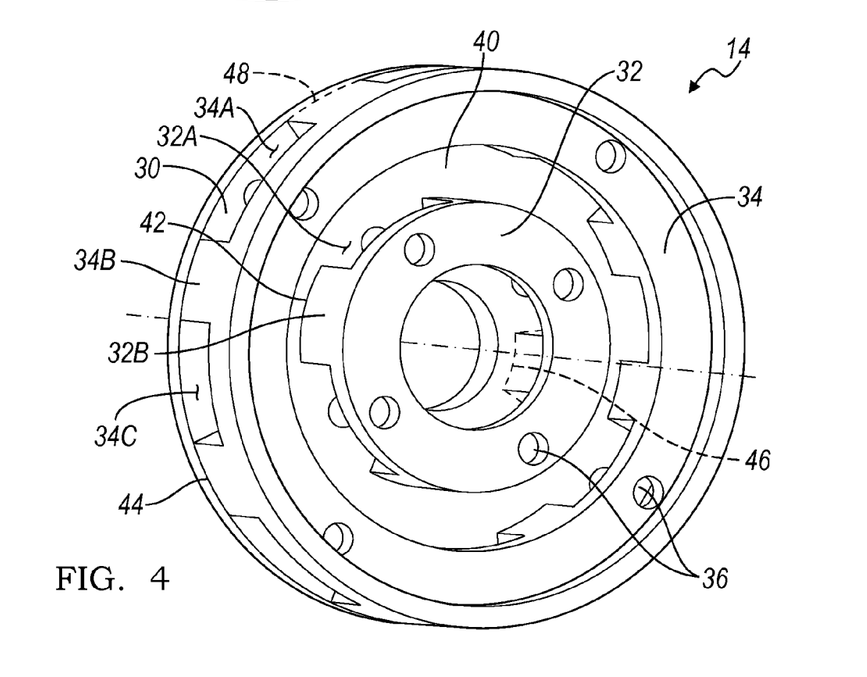
FIG. 4 is an isometric back view of a carrier assembly used in the stacked planetary gear set manufactured according to the principles of the present invention.

Turning to FIG. 4, a method of manufacturing the carrier 14 will now be described. First, the back plate 30 is formed and/or machined from steel or powdered metal while the inner and outer spiders 32, 34 are formed from precision powdered metal. In one embodiment, each of the spiders 32 and 34 are brazed to a surface 40 of the back plate 30. For example, the inner spider 32 includes axially and circumferentially oriented windows 32A defined by axially extending legs 32B. Each of the legs 32B are brazed to the back plate 30, thereby creating brazed joints 42 at each contact area between the legs 32B and the surface 40 of the back plate 30. Likewise, the outer spider 34 includes axially and circumferentially oriented windows 34A defined by axially extending legs 34B. Each of the legs 34B are brazed to the back plate 30, thereby creating brazed joints 44 at each contact area between the legs 34B and the surface 40 of the back plate. Once the spiders 32, 34 have been brazed to the back plate 30, the plurality of pinion holes 36 are precision machined through the spiders 32, 34 and the back plate 30.

In an alternate method of manufacturing the carrier member 14, the spiders 32 and 34 are precision formed and/or stamped steel, or formed from powdered metal. Each of the spiders 32 and 34 are welded to the surface 40 of the back plate 30. For example, each of the legs 32B are welded to the back plate 30, thereby creating welded joints, one of which is shown as a dashed line and indicated by reference number 46. Preferably, each contact area between the legs 32B and the surface 40 of the back plate is welded to create a weld joint 46. Likewise, each of the legs 34B is welded to the back plate 30, thereby creating welded joints, one of which is shown as a dashed line and indicated by reference number 48. Preferably, each contact area between the legs 34B and the surface 40 of the back plate is welded to create a weld joint 48. Once the spiders 32, 34 have been welded to the back plate 30, the plurality of pinion holes 36 are precision machined through the spiders 32, 34 and the back plate 30. Alternatively, the spider legs 32B, 34B may be attached to the back plate 30 by rolling, spinning, riveting, or staking.

Once the carrier member 14 has been assembled, the inner planet gears 22 are moved through additional windows 34C formed through the outer spider 34 by the legs 34B. The windows 34C are in radial alignment with the windows 32A of the inner spider. The inner planet gears 22 may then be positioned through the windows 32A and into alignment with pinion holes 36 of the inner spider 32. The pinion pins 38 are then inserted into the pinion holes 36 of the inner spider 32 and through the inner planet gears 22, as well as through thrust washers (not shown) and needle bearings (not shown). The pinion pins 38 are secured to one or both of the back plate 30 and the inner spider 32. The outer planet gears 24 are positioned through the windows 34A and into alignment with pinion holes 36 of the outer spider 34. The pinion pins 38 are then inserted into the pinion holes 36 of the outer spider 34 and through the outer planet gears 24, as well as through thrust washers (not shown) and needle bearings (not shown). The pinion pins 38 are secured to one or both of the back plate 30 and the outer spider 34.

Figure 5:
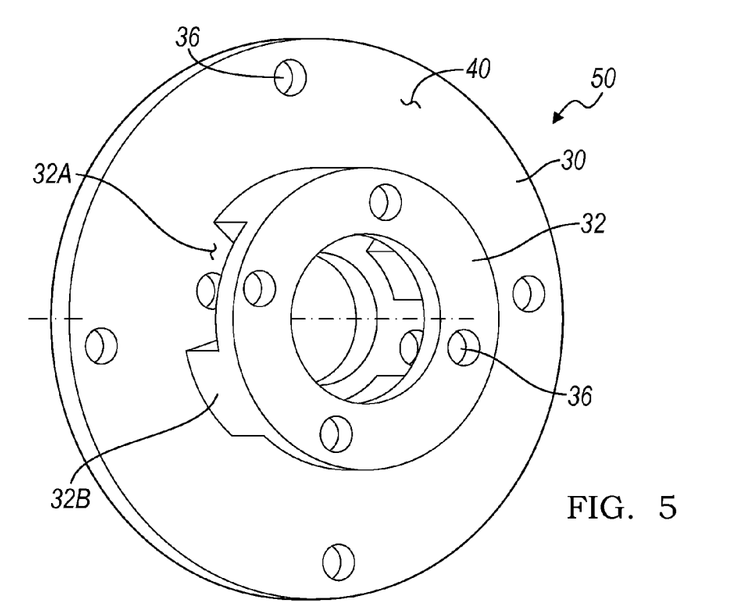
FIG. 5 is an isometric back view of an inner carrier member used in the stacked planetary gear set manufactured according to the principles of the present invention.
Figure 6:
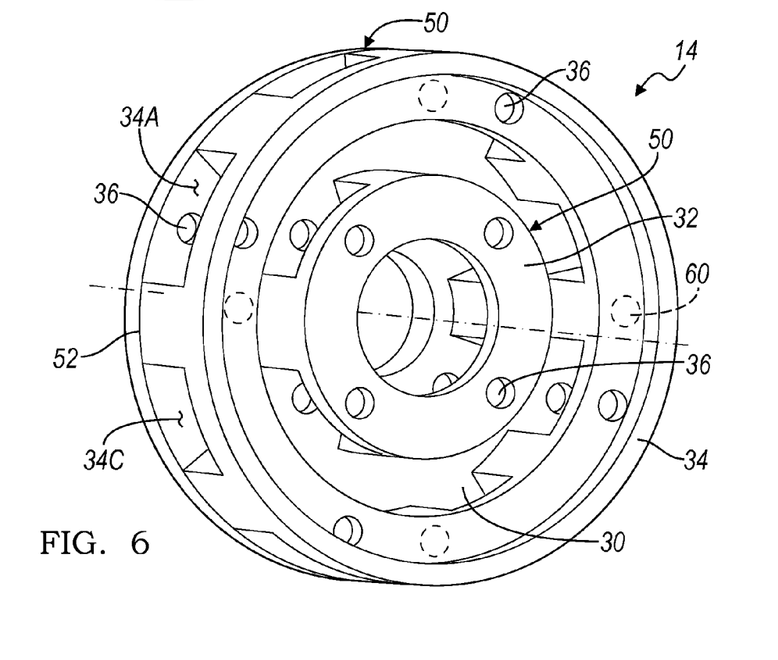
FIG. 6 is an isometric back view of a carrier assembly used in the stacked planetary gear set manufactured according to the principles of the present invention.

Turning to FIGS. 5 and 6, an alternate method of manufacturing the carrier assembly 14 will now be described. First, the back plate 30 and the inner spider 32 are precision cast as a single inner carrier member 50. Accordingly, the inner spider 32 has a back plate portion 30 surrounding the legs 32B of the inner spider 32. The windows 32A are machined into the spider 32 of the inner carrier member 50. The outer spider 34 is separately formed and/or machined steel, or formed from powdered metal. In one embodiment, the outer spider 34 is welded to the surface 40 of the back plate 30 of the inner carrier member 50. Each of the legs 34B are welded to the back plate 30, thereby creating weld joints 52 at each contact area between the legs 34B and the surface 40 of the back plate 30 of the inner carrier member 50. Once the spider 34 has been welded to the inner carrier member 50, the plurality of pinion holes 36 are precision machined through the spiders 32, 34 and the back plate 30. The planet gears 22, 24, the pinion pins 38, and the thrust washers and needle bearings are then sub-assembled as described above.

In an alternate method of manufacturing the carrier member 14, the outer spider 34 is powdered metal, formed and/or machined steel, or formed via casting. The outer spider 34 is pin assembled to the inner carrier member 50 via a plurality of pins, indicated by dashed lines and reference number 60. The pins 60 may be riveted or welded to the spider 34 and the inner carrier member 50. The planet gears 22, 24, the pinion pins 38, and the thrust washers and needle bearings are then sub-assembled as described above. In another embodiment, the windows 34C may be eliminated. Instead, the inner carrier member 50 and the outer spider 34 are temporarily fixed at the pin 60 locations and the pinion holes 36 are machined through the inner carrier member 50 and the outer spider 34. The outer spider 34 is removed and the inner planet gears 22, pinion pins 38, and the thrust washers and needle bearings are assembled on the inner carrier member 50 through the windows 32A. The outer planet gears 24, pinion pins 38, and thrust washer and needle bearings are then pre-assembled on the outer spider 34. The assembled outer spider 34 is then aligned with the inner carrier member 50 and attached via the pins 60.

Figure 7:
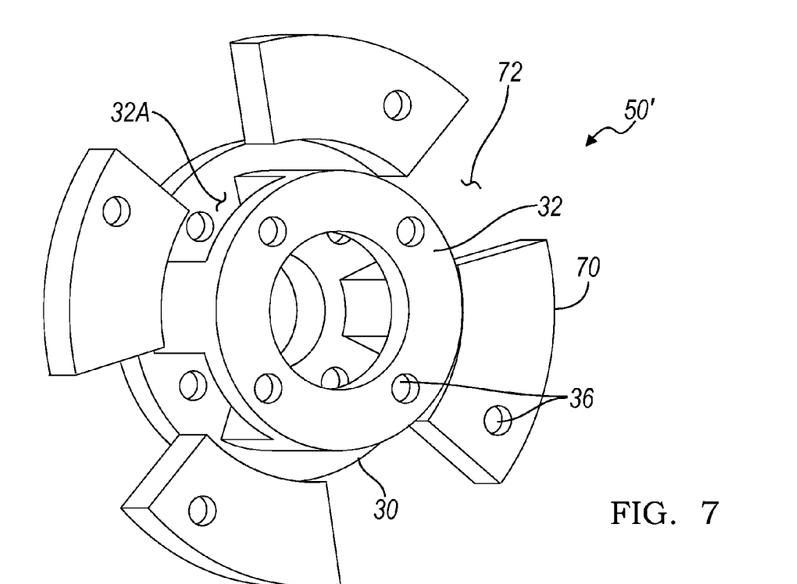
FIG. 7 is an isometric back view of an inner carrier member having an axial offset used in the stacked planetary gear set manufactured according to the principles of the present invention.

With reference to FIG. 7, an alternate embodiment of the inner planet carrier 50 described in FIGS. 5 and 6 is generally indicated by reference number 50'. The inner planet carrier 50' is similar to the inner planet carrier 50, however, the inner planet carrier 50' is configured to axially step the outer planet gear 24 from the inner planet gears 22 (i.e. the outer planet gears 24 are not disposed in the same plane as the inner planet gears 22). The inner carrier member 50' includes a plurality of axially offset flanges 70. The flanges 70 are spaced equidistant around the outer periphery of the back plate 30. Adjacent flanges 70 define openings 72 there between to allow access to the windows 32A. The outer spider 34 is then attached to the inner carrier member 50' at the flanges 70. The inner carrier member 50' and the outer spider 70 may be made and assembled as described above and shown in FIGS. 5 and 6.

Figure 8:
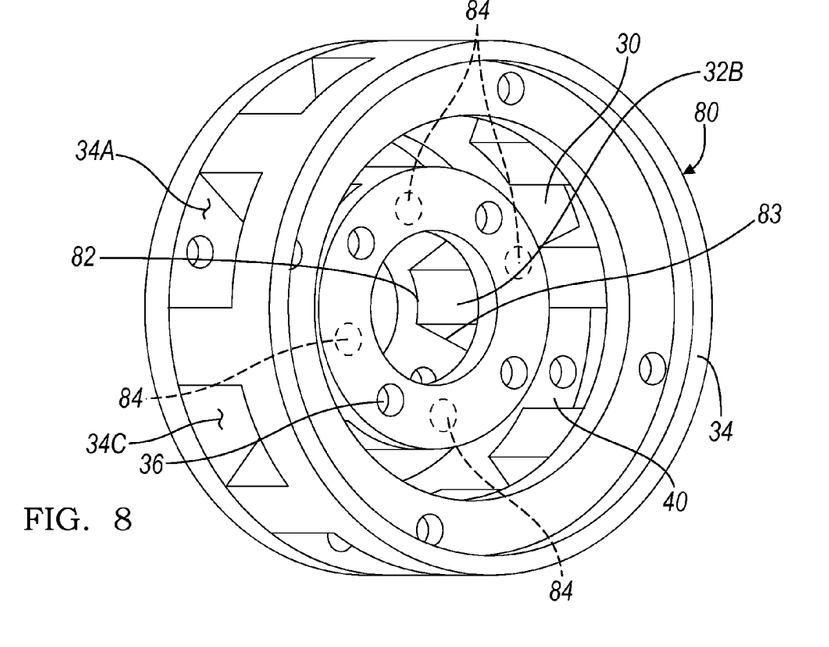
FIG. 8 is an isometric back view of a carrier assembly used in the stacked planetary gear set manufactured according to the principles of the present invention.

Turning to FIG. 8, another method of manufacturing the carrier assembly 14 will now be described. First, the back plate 30 and the outer spider 34 are precision cast as a single outer carrier member 80. Accordingly, the outer spider 34 has a back plate portion 34 that extends radially inwardly from the outer legs 34B. The windows 34A and 34C are machined into the spider 34 of the outer carrier member 80. The inner spider 32 is separately formed and/or machined metal, such as steel or aluminum. In one embodiment, the inner spider 32 is welded to the surface 40 of the back plate 30 of the outer carrier member 80 at face slots 83. The face slots 83 are formed in the surface 40 of the back plate and are sized to receive each of the legs 32B. Each of the legs 32B are welded to the back plate 30, thereby creating weld joints 82 at each contact area between the legs 32B and the surface 40 of the back plate 30 of the outer carrier member 80. Once the spider 32 has been welded to the outer carrier member 80, the plurality of pinion holes 36 are precision machined through the spiders 32, 34 and the back plate 30. The planet gears 22, 24, the pinion pins 38, and the thrust washers and needle bearings are then sub-assembled as described above. As hereinbefore described, the spider legs 32B may be attached to the back plate 30 by rolling, staking, spinning, riveting, or pin staking.

In an alternate method of manufacturing the carrier member 14, the inner spider 32 is powdered metal, formed and/or machined steel, or formed via casting. The inner spider 32 is pin assembled to the inner carrier member 50 via a plurality of pins, indicated by dashed lines and reference number 84. The pins 84 may be riveted or welded to the spider 32 and the outer carrier member 80. The planet gears 22, 24, the pinion pins 38, and the thrust washers and needle bearings are then sub-assembled as described above. In another embodiment, the windows 34C may be eliminated. Instead, the outer carrier member 80 and the inner spider 32 are temporarily fixed at the pin 84 locations and the pinion holes 36 are machined through the outer carrier member 80 and the inner spider 32. The inner spider 32 is removed and the inner planet gears 22, pinion pins 38, and the thrust washers and needle bearings are pre-assembled on the inner spider 32. The assembled inner spider 32 is then aligned with the outer carrier member 80 and attached via the pins 84. The outer planet gears 24, pinion pins 38, and thrust washer and needle bearings of the outer planet carrier 80 may be assembled before or after the assembly of the inner spider 32.

Figure 9:
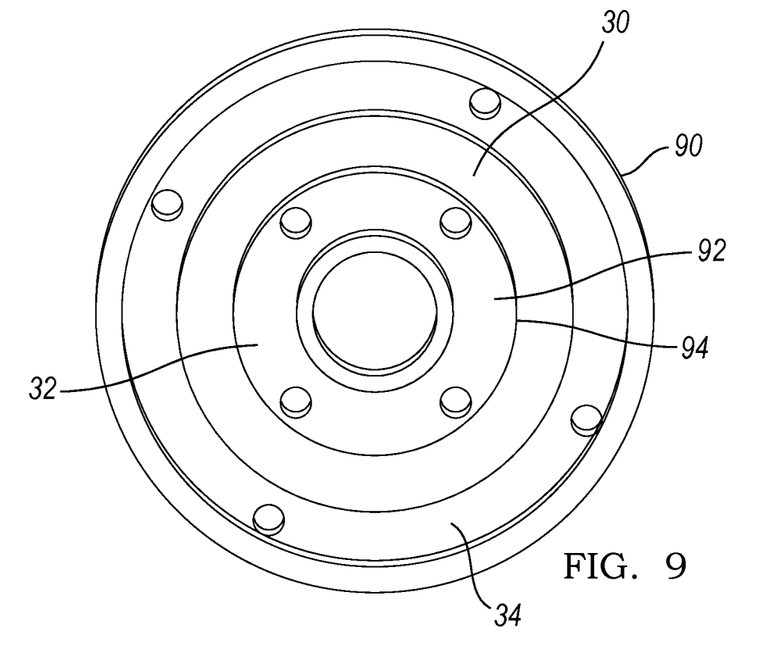
FIG. 9 is an isometric back view of a carrier assembly used in the stacked planetary gear set manufactured according to the principles of the present invention.
Figure 10:
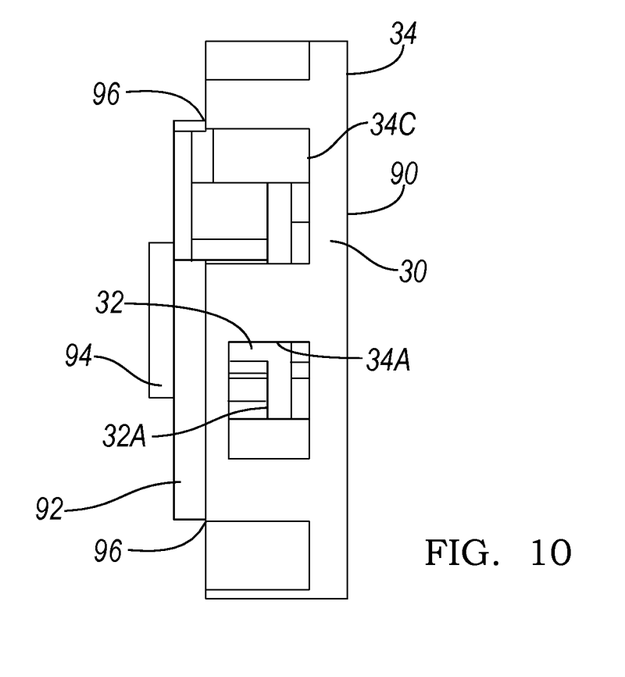
FIG. 10 is a side view of the carrier assembly shown in FIG. 9 used in the stacked planetary gear set manufactured according to the principles of the present invention.

Turning to FIGS. 9 and 10, another method of manufacturing the carrier assembly 14 will now be described. First, the back plate 30 and the outer spider 34 are precision cast as a single outer carrier member 90 and a front plate 92 and the inner spider 32 are precision cast as a single inner carrier member 94. The inner and outer planet carriers 90 and 94 are welded or splined at interfaces located adjacent the windows 34A, indicated by reference number 96. Accordingly, the windows 34A are preferably enclosed. Once the inner carrier member 94 is connected to the outer carrier member 90, the plurality of pinion holes 36 are precision machined through the spiders 32, 34 and the back plate 30. The planet gears 22, 24, the pinion pins 38, and the thrust washers and needle bearings are then sub-assembled through the windows 32A and 34A, 34C as described above.

The description of the invention is merely exemplary in nature and variations that do not depart from the gist of the invention are intended to be within the scope of the invention. Such variations are not to be regarded as a departure from the spirit and scope of the invention.

What is claimed is:

1. A method of manufacturing a stacked planetary gear set, the method comprising:
    forming an inner carrier spider and an outer carrier spider, at least one of the inner and outer carrier spiders being formed in at least one of the following ways: by precision casting, by stamping, and from powdered metal;

attaching each of the inner carrier spider and the outer carrier spider directly to a first surface of a back plate;

wherein the inner and outer carrier spiders are each formed having a plurality of legs defining a plurality of circumferentially oriented windows.

2. The method according to claim 1, wherein the step of attaching the inner carrier spider to the back plate is accomplished by at least one of welding, brazing, rolling, staking, and pin staking.

3. The method according to claim 2, further comprising attaching the outer carrier spider to the back plate by at least one of welding, brazing, rolling, staking, and pin staking.

4. The method according to claim 3, wherein both the inner and outer carrier spiders are formed in at least one of the following ways: from powdered metal, by precision casting, and by stamping.

5. The method according to claim 4, wherein the step of attaching the inner carrier spider to the back plate includes attaching the legs of the inner carrier spider to the back plate.

6. The method according to claim 5, further comprising precision machining pinion holes through the inner and outer spider carriers and the back plate.

7. The method according to claim 6, further comprising inserting a plurality of inner planet gears through the windows of the outer and inner spider carriers, inserting a corresponding plurality of inner pinion pins through the plurality of inner planet gears, and securing the plurality of inner pinion pins to at least one of the back plate and the inner carrier spider.

8. The method according to claim 7, further comprising inserting a plurality of outer planet gears through the windows of the outer spider carrier, inserting a corresponding plurality of outer pinion pins through the plurality of outer planet gears, and securing the plurality of outer pinion pins to at least one of the outer spider carrier and the back plate.

9. The method according to claim 8, further comprising forming the back plate to include a step between the legs of the inner spider carrier and the legs of the outer spider carrier.

10. The method according to claim 2, wherein the step of attaching the inner carrier spider to the one of the outer carrier spider and the back plate comprises attaching a back plate portion of the inner carrier spider to the outer carrier spider.

11. The method according to claim 10, wherein the inner and outer carrier spiders are each formed having a plurality of legs defining a plurality of circumferentially oriented windows.

12. The method according to claim 11, wherein the step of attaching the outer carrier spider to the black plate portion of the inner carrier spider includes at least one of brazing, welding, rolling, staking, and pin staking the legs of the outer carrier spider to the back plate portion of the inner carrier spider.

13. The method according to claim 12, further comprising precision machining pinion holes through the inner and outer spider carriers.

14. The method according to claim 13, further comprising inserting a plurality of inner planet gears through the windows of the outer and inner spider carriers, inserting a corresponding plurality of inner pinion pins through the plurality of inner planet gears, and securing the plurality of inner pinion pins to the inner carrier spider.

15. The method according to claim 14, further comprising inserting a plurality of outer planet gears through the windows of the outer spider carrier, inserting a corresponding plurality of outer pinion pins through the plurality of outer planet gears, and securing the plurality of outer pinion pins to at least one of the outer spider carrier and the back plate portion of the inner carrier spider.

16. A method of manufacturing a stacked planetary gear set, the method comprising:

forming an inner carrier spider in one of the following ways: from powdered metal, by precision casting, and by stamping, wherein the inner carrier spider is formed having a plurality of inner legs defining a plurality of circumferentially oriented inner windows;

forming an outer carrier spider in one of the following ways: from powdered metal, by precision casting, and by stamping, wherein the outer carrier spider is formed having a plurality of outer legs defining a plurality of circumferentially oriented outer windows;

attaching the plurality of inner legs and the plurality of outer legs directly to a first surface of a back plate by brazing or welding;

precision machining pinion holes through the inner and outer spider carriers and the back plate;

inserting a plurality of inner planet gears through the inner and outer windows, inserting a corresponding plurality of inner pinion pins through the plurality of inner planet gears, and securing the plurality of inner pinion pins to at least one of the back plate in the inner carrier spider; and inserting a plurality of outer planet gears through the outer windows, inserting a corresponding plurality of outer pinion pins through the plurality of outer planet gears, and securing the plurality of outer pinion pins to at least one of the outer spider carrier and the back plate.

* * * * *